United States Patent Office 3,472,824
Patented Oct. 14, 1969

3,472,824
SULFUR CURABLE COPOLYMERS OF OLEFINS AND ISO-ETHENYL NORBORNENES AND METHOD FOR PRODUCTION THEREOF
Kohei Nakaguchi, Kobe, Shohachi Kawasumi, Takatsuki-shi, and Kazumi Takagi and Kozo Fukuba, Niihama-shi, Masaaki Hirooka, Ibaraki-shi, and Toshimichi Fujita, Niihama-shi, Japan, assignors to Sumitomo Chemical Company, Ltd., Osaka, Japan, a corporation of Japan
No Drawing. Filed Dec. 15, 1966, Ser. No. 601,845
Claims priority, application Japan, Nov. 22, 1966, 41/76,822
Int. Cl. C08f 19/00
U.S. Cl. 260—80.78          13 Claims

ABSTRACT OF THE DISCLOSURE

A sulfur curable copolymer of ethylene and/or α-olefins with a norbornene compound, e.g. isopropenyl norbornene.

---

This invention relates to copolymers of ethylene and/or α-olefins and bridged ring hydrocarbon compounds and a method for the production thereof.

Attempts to make amorphous saturated hydrocarbon polymers sulfur-curable by introduction of double bonds have been known from old times as seen in the case of butyl rubber obtained by copolymerizing isobutylene with a small amount of isoprene. Recently, by virtue of the discovery of Ziegler type catalysts, there has been found a process for preparing amorphous copolymers of ethylene and propylene. Since said copolymers have various characteristics as excellent rubbers, much attention is paid to said copolymers. In the case of this kind of olefin copolymers also, attempts have been made to produce sulfur-curable amorphous copolymers by introduction of various diene compounds, based on the same idea as in the case of butyl rubbers. However, it is not always possible to say that any diene compounds or any polymerization prescriptions can effectively give rubbers excellent in curing characteristics.

British Patent No. 880,904 (Dunlop Rubber Co.), which relates to a process for producing copolymers of aliphatic monoolefins and unsaturated bridged ring hydrocarbon compounds, discloses norbornadiene and dicyclopentadiene as unsaturated derivatives of bicyclo-(2,2,1)-heptane, for example. The above-mentioned British patent defines that the catalyst system employed in said polymerization reactions is a surface active catalyst which is a mixture of a heavy metal selected from sub groups of Groups IV–VII or from Group VIII of the Periodic Table, and a compound selected from the group consisting of (a) organic compounds of metals of Groups I–IV, preferably Groups II–III, of the Periodic Table, (b) metal hydride or organo-metallic hydrides and (c) organo-metallic halogen compounds. Typical as such catalyst is one obtained by reacting trialkylaluminum with a tetrahalide of titanium or vanadium. The British patent employs in the example a catalyst comprising triisobutylaluminum and vanadium tetrachloride.

E. K. Gladding et al. of Du Pont [I & EC Prod. Ras. Dev., 1 [2], 65 (1962)], have concluded from the results of detailed examination of ethylene-propylene-diene ternary copolymerization using tetrachloroethylene as solvent in the presence of a triisobutylaluminum-vanadyl trichloride catalyst, that as diene components, aliphatic short chain dienes are not preferable due to their high polymerization-inhibiting actions and conjugated dienes are neither desirable. As preferable diene components, there are raised dicyclopentadiene, methylene-norbornene, methylnorbornadiene and 11-ethyl-1,11-tridecadiene. Du Pont patents, which are related to the above literature (e.g. British Patent No. 925,468, May 8, 1963), disclose as cyclic diene compounds the following unsaturated norbornene derivatives:

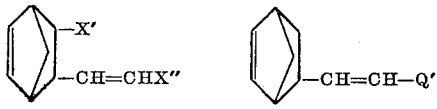

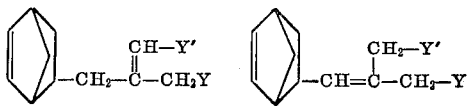

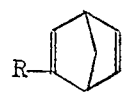

wherein X', X", Y', R and Q' are alkyl groups; and Y is an alkyl group or hydrogen atom.

In view of the diene components shown above, it is understood that all of them have terminal vinyls or internal double bonds (vinylenes).

In addition thereto, there have been proposed several processes for preparing sulfur-curable olefin copolymers by use of norbornene compounds having unsaturated groups in the side chains (refer to, for example, British Patents Nos. 1,018,778 and 1,007,908), but the double bonds in the side chains thereof neither contain vinylidene-type double bonds.

The present inventors have found that sulfur-curable copolymers can be successfully prepared by copolymerizing ethylene and/or α-olefins with ethenyl norbornene compounds having the general formula

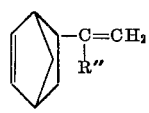

wherein R" is a hydrocarbon residue having 1–8 carbon atoms.

The ethenyl norbornenes used in the present invention have excellent characteristics. In the first place, the compounds of this kind are markedly easily copolymerizable with olefins such as ethylene and propylene. For example, isopropenyl norbornene copolymerizes far faster than methyl tetrahydroindene which is an isomer obtained by the Diels-Alder reaction of cyclopentadiene and isoprene. This not only makes it possible to obtain a copolymer in a short period of time but can minimize the concentration of isopropenyl norbornene compound in the polymerization system, and is of importance signifying the fact that one pass-conversion can be made extremely high. In the second place, the resulting copolymer is markedly high in curing rate. It has conventionally been known that in sulfur-curing, a terpolymer prepared by adding a diene compound to ethylene-propylene, for example, is undesirably low in curing rate, in general. Therefore, the advent of compounds high in curing rate has been desired. The ethenyl norbornenes employed in the present method are characterized in that they have side chains of the vinylidene type and give excelent curing rates. For example, they are cured 3–4 times faster than a terpolymer in which dicyclopentadiene is used as diene component.

That is, the present invention provides a copolymer comprising ethylene and/or an α-olefin having the general formula $CH_2=CHR'$, wherein R' is an alkyl group having 1–8 carbon atoms, and an ethenyl norbornene compound having the general formula

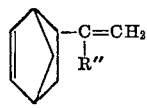

wherein R″ is a hydrocarbon residue having 1–8 carbon atoms.

However, it is not always possible to say that in effecting the copolymerization of olefins with the diene compounds having the above-mentioned general formula, the use of any catalysts can give excellent copolymers. The present inventors have found that excellent polymerizability and curing characteristics can be attained when there is used a catalyst system containing as required components an organo-aluminum halide represented by the general formula $AlR_nX_{3-n}$, wherein R is a hydrocarbon residue having 1–20 carbon atoms; X is a halogen; and $n$ is an arbitrary number of 1–2, and a vanadium compound in which vanadium is bonded to at least one group selected from the class consisting of halogen, acetylacetonate, alkoxide, cyclopentadienyl and organic acid residue.

That is, the present invention provides a method for producing sulfur-curable olefin copolymers, characterized by copolymerizing, in the presence of a catalyst containing a vanadium defined above and an organoaluminum halide having a general formula $AlR_nX_{3-n}$, as an essential component, ethylene and/or α-olefins having the general formula

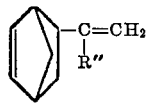

wherein R″ is a hydrocarbon residue having 1–8 carbon atoms.

The α-olefins to be used in the present method are those having the general formula $CH_2=CHR'$, wherein R′ is an alkyl group having 1–8 carbon atoms, and include, for example, propylene; butene-1; pentene-1; 4-methyl-pentene-1; hexene-1; heptene-1; octene-1; nonene-1; decene-1; 5-methyl-nonene-1; 5,5-dimethyl-octene-1; 4-methyl-hexene-1; 4-methyl-heptene-1; 6-methyl-heptene-1, and 5,6,6-trimethyl-heptene-1. Excellent results are easily obtainable particularly when ethylene and propylene or butene-1 are used.

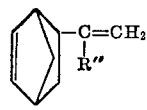

are compounds having as R″ a hydrocarbon residue having 1–8 carbon atoms and compounds having alkyl, aryl, aralkyl, alkylaryl or cycloalkyl groups are exemplified. Particularly, the use of compounds having alkyl groups with 1–4 carbon atoms readily gives favorable results. Examples of these compounds are 5-isopropenyl-2-norbornene;
5-(1′-ethyl-ethenyl)-2-norbornene;
5-(1′-n-propyl-ethenyl)-2-norbornene;
5-(1′-isopropyl-ethenyl)-2-norbornene;
5-(1′-n-butyl-ethenyl)-2-norbornene;
5-(1′-n-hexyl-ethenyl)-2-norbornene;
5-(1′-cyclohexyl-ethenyl)-2-norbornene;
5-(1′-phenyl-ethenyl)-2-norbornene; and
5[1′-(2″-ethylhexyl)-ethenyl]-2-norbornene.

The organo-aluminum halides having the general formula $AlR_nX_{3-n}$ are those having a hydrocarbon residue having 1–20 carbon atoms as R; a halogen as X; and an arbitrary number between 1 and 2 as $n$. Preferable compounds are those having as R an alkyl, aryl, aralkyl, alkylaryl or cycloalkyl group. Particularly, alkyl compounds having 1–6 carbon atoms give favorable results.

If necessary, however, there may be used compounds having other hydrocarbon group such as, for example, cyclopentadienyl or alkenyl group. In the formula, X is chlorine, bromine or iodine. In some cases, fluorine may also be used. Further, $n$ is an arbitrary number between 1 and 2. The organo-aluminum halide is not required to be composed of a single component but may be in the form of any mixture so far as the average composition thereof coincides with said general formula. In the method of the present invention, there may also be used, in particular, mixtures of dialkylaluminum halides or alkylaluminum dihalides, mixtures of trialkylaluminum and alkylaluminum halides or aluminum trihalides, or mixtures of aluminum trihalides and dialkylaluminum halides. In the present method, particularly excellent characteristics can be attained when ethylaluminum halides having ethyl groups are used. These organo-aluminum halides include, for example, ethylaluminum dichloride,
ethylaluminum dibromide,
ethylaluminum diiodide,
n-propylaluminum dichloride,
isobutylaluminum dichloride,
n-hexylaluminum dichloride,
octadecylaluminum dichloride,
phenylaluminum dichloride,
ehtylaluminum sesquichloride,
ethylaluminum sesquibromide,
ethylaluminum sesquiiodide,
methylaluminum sesquichloride,
n-propylaluminum sesquichloride,
isobutylaluminum sesquichloride,
n-hexylaluminum sesquichloride,
cyclohexylaluminum sesquichloride,
2-ethylhexylaluminum sesquichloride,
laurylaluminum sesquichloride,
diethylaluminum chloride,
dimethylaluminum chloride,
di-n-butylaluminum chloride,
ethylpropenylaluminum chloride,
dicyclopentadienylaluminum chloride and
cyclohexylethylaluminum chloride, mixtures of these compounds in arbitrary proportions, mixtures thereof with trialkylaluminum or aluminum halides, and mixtures prepared by blending trialkylaluminum with aluminum halides so as to correspond to the general formula $AlR_nX_{3-n}$.

Vanadium compounds, which are the other components of the catalyst employed in the present method, are compounds containing vanadium bonded to at least one group selected from the class consisting of halogens, acetylacetonate, alkoxide, cyclopentadienyl and organic acid residue. As such compounds, there may be raised vanadium halides, vanadyl halides, vanadium acetylacetonate, vanadyl acetylacetonate, vanadium haloacetylacetonate, vanadyl haloacetylacetonate, orthovanadates, e.g. those containing hydrocarbon groups having 1–20 carbon atoms, particularly those containing alkyl groups having 1–8 carbon atoms, vanadyl haloalkoxides, cyclopentadienyl vanadium, halogen-cyclopentadienyl vanadium and vanadium salts of organic acids. Examples of these compounds are vanadium tetrachloride, vanadium trichloride, vanadyl trichloride, vanadium triacetylacetonate, vanadyl diacetylacetonate, dichlorovanadylacetylacetonate, chlorovanadylacetylacetonate, triethylorthovanadate, triisobutyl orthovanadate, tri-n-hexyl orthovanadate, tricyclohexyl orthovanadate, triphenyl orthovanadate, chlorovanadyl diethoxide, bromovanadyl diethoxide, chlorovanadyl-di-n-octoxide, dichlorovanadyl methoxide, dichlorovanadyl ethoxide, dichlorovanadyl stearoxide, dicyclopentadienyl vanadium, vanadium acetate and vanadium propionate.

In the present method, the polymerization is effected by use of catalyst systems containing, as essential components, such organoaluminum halides and vanadium compounds as mentioned above. However, other suitable compounds may be added as third components of the catalysts. As such compounds, there are, for example, electron-donor compounds having coordination tendency or other interactions with the organoaluminum halides or vanadium compounds, or there are various oxidizing substances which prevent the vanadium compounds from lowering in activity due to excessive reduction by the organoaluminum halides. Examples of the electron-donor compounds are amines, cyclic nitrogen-containing compounds, acid amides, ethers, esters, ketones, aldehydes, and compounds of the Group Vb elements of the Mendeléeleff's Periodic Table, such as phosphorus, arsenic, antimony and bismuth. Examples of the oxidizing substances are halogens, metal halides, oxygen, nitro compounds, nitroso compounds, organic nitrates, nitrites, N-oxides, P-oxides, azo compounds, organic sulfides, disulfides, quinones and acid halides.

In practicing the present method, the proportion of organoaluminum halide and vanadium compound employed is not particularly limited, but favorable results are obtained when the two are used in proportions of 1:1–1,000:1, preferably 2:1–300:1. When represented by its concentration in the reaction medium employed, the vanadium compound is frequently used at a concentration of 0.001–30 mmol/l., particularly 0.01–2 mmol/l., and the organoaluminum halide is frequently used at a concentration of 0.1–100 mmol/l., particularly 0.5–20 mmol./l.

In case trialkylaluminum is used as a catalyst component in place of the organoaluminum compound, the polymerization activity is low, in general, or even if said activity is equal to the case when the organoaluminum halide is used, the resulting polymer is inferior in properties. For example, there are many cases where a crystalline portion is formed in relatively large amount or the reaction manner of diene component is not suitable to attain sufficiently excellent curing characteristics. In contrast thereto, the copolymers obtained in accordance with the present method are characterized in that they are rich in random property and are excellent in homogeneity as compared with those obtained according to the conventional processes. Therefore, cured products of such copolymers are excellent in physical properties and there are obtained rubbers high in tensile strength. Particularly excellent polymerization activity can be attained when the organoaluminum halides employed are mixtures of dialkylaluminum halides and monoalkylaluminum dihalides. Further, copolymers obtained by use of such mixtures are particularly excellent in curing characteristics. It has been found that of the organoaluminum halides, those having ethyl groups give particularly favorable results.

In practicing the present method, the catalyst components may be added to the reaction system by optional procedures. For example, there is adopted a procedure carried out by previously mixing the catalyst components altogether and then charging the mixture into a reaction medium containing the monomers, or a procedure effected by individually adding the catalyst components to the reaction system. Generally speaking, when a high catalyst activity is desired to be attained, it is preferable to mix the organoaluminum halide with the vanadium compound in the presence of monomers. Further, in order to avoid the catalyst from lowering in activity due to lapse of time, the polymerization is desirably effected at low temperatures.

As the result of various investigations of catalyst systems suitable for the production of the present copolymers, the present inventors have further found that the catalyst systems shown below are particularly excellent. That is, the present invention provides a method for producing copolymers, characterized in that ethylene and/or an α-olefin having the general formula $CH_2=CHR'$ wherein R' is an alkyl group having 1–8 carbon atoms, and an ethenyl norbornene compound having the general formula

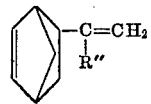

wherein R'' is a hydrocarbon residue having 1–8 carbon atoms are contacted with an organoaluminum dihalide having the general formula

wherein R is a hydrocarbon residue having 1–20 carbon atoms, a compound having the general formula

wherein $R^{IV}$ is a hydrocarbon residue having 1–20 carbon atoms or a derivative group thereof; Y is a halogen; and m is 1 or 2, and a vanadium compound in which vanadium is bonded to at least one group selected from the class consisting of halogens, acetylacetonate, alkoxide, cyclopentadiene and organic acid residue.

The catalyst system composed of this kind of combination has several excellent characteristics. In the first place, the vanadium compound is possible to be used in a small amount as compared with the case of conventional catalyst systems. For example, in the case where the conventional catalyst system requires the vanadium compound at a concentration of 0.1–1 mmol/l., the present catalyst can give the same extent of effect using said compound at a concentration of, for example, 0.001–0.1 mmol/l. This not only results in the advantage that the cost of catalyst can be reduced but also makes one expect such an effect that the catalyst components remaining in the resulting copolymer, a particularly injurious transition metal component can be removed substantially completely. Such excellent effect cannot be achieved unless the sulfur compound having the general formula $R^{IV}SO_mY$ is added. By addition of this sulfur compound, the polymerization is markedly accelerated. It is considered that this kind of sulfur compound forms a complex with the organoaluminum dihalide to give an active species, unlike the case where no such compound is added. This is an extremely unexpected fact, considering that a sulfur compound has heretofore been deemed to have a retarding action on Ziegler type catalyst.

Another excellent characteristic of the present catalyst system is that the sulfur compound effectively controls the molecular weight of the product. In polymerizing olefins in the presence of Ziegler type catalysts, there are many cases where the resulting polymers are excessively high in molecular weight, and the control of molecular weight is a problem of importance. When the present catalyst system is used, the molecular weight of the product can be lowered by increasing the amount of the sulfur compound.

The compounds having the general formula $R^{IV}SO_mY$ are represented by sulfonic acid halides and sulfinic acid halides. In the formula, the halogen is chlorine, bromine or iodine, and may be fluorine in some cases, and $R^{IV}$, which is a hydrocarbon, may have other inert substituted group in addition thereto. Examples of these compounds are benzenesulfonyl chloride, benzenesulfinyl chloride, benzenesulfonyl bromide, benzenesulfonyl iodide, p-toluenesulfonyl chloride, o-toluenesulfonyl chloride, m-xylenesulfonyl chloride-(4), benzylsulfonyl chloride, α-naphthalenesulfonyl chloride, p-chlorobenzenesulfonyl chloride, m-chlorobenzenesulfonyl chloride, p-bromobenzenesulfonyl chloride, p-nitrobenzenesulfonyl chloride, p-aminobenzenesulfonyl chloride, 2-aminotoluenesulfonyl chloride-(4), 4-aminophenolsulfonyl chloride, β-naphthylamine-(1)-sulfonyl chloride-(5), naphthol-(2)-disulfonyl chloride-(3,6), 1,2-dioxyanthraquinonesulfonyl chloride-(7), cyclohexanesulfonyl chloride, methylcyclohexanesulfonyl chloride, propanesulfonyl chloride, ethanesulfonyl chloride, chloroethanesulfonyl chloride and methanesulfonyl chloride. Other components can be deemed same as mentioned above.

In practicing the process of the present invention, it is generally preferable to employ an organoaluminum halogen compound in the reaction medium at a concentration of higher than 0.1 mmol/l. alike in the case of the conventional method, particularly at a concentration of 1–20 mmol gives a favorable result. Further addition than the above range may of course be made. The compound having the general formula $R^{IV}SO_mY$ contributes toward the polymerization reaction even with an addition of a relatively small amount thereof, and therefore it is not desirable to add an excessively large amount. In general, $R^{IV}SO_mY$ compound is employed in a proportion of 0.001–10 mole per 1 mole of an organoaluminum halogen compound. Particularly, the most excellent result can be obtained when it is employed in an equimolar proportion or so. Furthermore, the vanadium compound, i.e. the third component of the catalyst is capable of giving the polymerization activity in a very slight amount, and its presence of a slight amount of 0.000001–0.001 mmol/l. in terms of a concentration in the reaction medium, exhibits an excellent polymerization activity. This is a characteristic which has not heretofore been observed, for example, in Ziegler catalyst using titanium compound, and it is one of the excellent features. The preferred concentration range is, for example, from 0.001–2 mmol/l., but such a high concentration at 2–10 mmol/l. can of course be employed. In general, the vanadium compound is suitably employed in a proportion of 0.00001–1 mmole per 1 mole of the organoaluminum compound when expressed in terms of a proportion to the organoaluminum halogen compound. However, the polymerization activity is variable depending on kinds of monomers and compositions, and therefore an optimum concentration may be varied according to these conditions.

In preparing catalyst, the order of addition of each catalyst component is not necessary to particularly define. However, polymerization activity of the catalyst system attained according to a method which comprises separately adding each component of the catalyst system to the reaction system, is generally superior to that attained in case of directly adding pre-mixed catalysts. Generally speaking, the better result may be obtained when a compound having the general formula $R^{IV}SO_mY$ is previously contacted with an organoaluminum halogen compound compared with a method in which $R^{IV}SO_mY$ type is first mixed with a vanadium compound.

In the process of the present invention, diene component may previously be dissolved in the reaction medium in carrying out the copolymerization, or may be simultaneously added thereto together with other monomers continuously or intermittently. In a method in which diene component is previously added to a liquid reaction medium, the diene component is frequently employed, for example, at a concentration of 1–20 mmol/l. or so. When a proportion of diene component contained in the produced copolymer is, for example, in a range of 1–50, particularly 3–20, expressed in an iodine number, an excellent cured product can be obtained.

In the present invention, in case of reacting only ethylene with diene, a curable polyethylene may be obtained. On the other hand, in order to obtain an amorphous elastomeric copolymer, it is preferable to prepare a terpolymer by use of ethylene together with α-olefin. Sulfur-curable elastomer is frequently intended to be prepared, and for this purpose, a terpolymer consisting of 40–90 mole percent of ethylene, 10–60 mole percent of α-olefin and 0.5–10 mole percent of ethenyl norbornene compound is particularly preferable. Particularly, it is preferable to use propylene or butene-1 as α-olefin, and isopropenyl norbornene as ethenyl norbornene.

In practicing the method of the present invention, polymerization pressure can be optionally selected. In general, the pressure condition of from atmospheric pressure to 30 kg./cm.² is widely employed. The polymerization may be carried out under a reduced pressure less than atmospheric pressure or in a system diluted with an inert gas, depending on the other conditions.

Reaction temperature may optionally be selected from a temperature ranging from such a low temperature as −78° C. to such a heated state at +100° C., but in general a temperature ranging from −35° C. to +70° C. gives a favourable result. Polymerization temperature should be determined at an optimum temperature in accordance with a combination of respective catalysts, and it is particularly useful to take into consideration the decay of catalyst activity according to the lapse of time.

In carrying out the method of the present invention, an inert solvent can be used, in general. Alternatively, a liquefied monomer may also be used as a medium of this kind. As the inert solvent of this kind, general hydrocarbon compound or halogenated hydrocarbon compound is suitably employed. There may be mentioned, for example, propane, butane, pentane, hexane, heptane, octane, petroleum ether, ligroin, other petroleum mixed solvent, benzene, toluene, xylene, cyclohexane, methyl cyclohexane, methylene dichloride, ethylene dichloride, trichloroethane, tetrachloroethylene, butyl chloride, chlorobenzene, and bromobenzene.

After completion of the polymerization reaction, the after-treatment was conducted according to usual procedures, whereby the polymerization resultant may be purified and recovered. As the usual procedures, there may be adopted after-treatments such as alcohol treatment; water or steam treatment; alcohol-hydrochloric acid treatment; hydrochloric acid-water treatment; alkali treatment; and aqueous emulsifying agent solution treatment, or any of after-treatments employed for the polymerization with Ziegler-Natta catalysts. Alternatively, the polymerization resultant may be precipitated without being subjected to these after-treatments, or the solvent may be removed therefrom, thereby to collect and recover the solid product. Moreover, during or after these treatments, also it is possible to add thereto antioxidant and other additives.

The present invention will be concretely illustrated further by referring to the following examples, but it should be understood that the present invention is not limited thereto.

EXAMPLE 1

1 l. of purified n-heptane was added to a four-necked flask of 2 l. capacity flushed with nitrogen and was placed in a thermostat at 25° C. Ethylene-propylene mixed gas containing 30 mole percent of ethylene was introduced thereinto at a rate of 3 l./min. and was saturated in the solvent. 6 mmol. of 5-isopropenyl-2-norbornene was added thereto. 2 mmol. of ethylaluminum sesquichloride and 0.25 mmol. of vanadyl trichloride in the form of heptane solution were further added thereto in this order. After 15 minutes, 20 ml. of methanol (containing β-phenyl-naphthylamine) was added in the system to terminate the reaction. The content was taken out therefrom and washed sufficiently with hydrochloric acid-methanol. After further repeating water washing, it was precipitated in methanol, rinsed and dried to obtain 11.35 g. of white amorphous copolymer. This copolymer comprised of 31.8 mol percent of propylene and had an iodine number of 11.8, and was always soluble in n-heptane at the room temperature. To 100 parts of the copolymer, were added 50 parts of HAF black, 5 parts of zinc oxide, 1.5 parts of sulfur, 1.0 part of stearic acid, 0.5 part of mercaptobenzothiazol and 1.5 parts of tetramethylthiuram monosulfide, incorporated therewith using a roll and the resulting mixture was press-cured at 160° C. for 40 minutes. The thus obtained cured product was pressed in the form of dumbbell and was subjected to Schopper's tensile tester, whereby the results of tensile strength of 238 kg./cm.², 300% modulus of 218 kg./cm.² and elongation of 390% were attained.

EXAMPLE 2

According to the same procedures as in Example 1, ethylene-propylene gas containing 27 mole percent of ethylene was saturated in 1 l. of n-heptane at 25° C., and 5 mmol. of 5-isopropenyl-2-norbornene was added thereto. To the mixture, were added 3 mmol. of diethylaluminum chloride and 1 mmol. of vanadium triacetylacetonate in this order. The polymerization was carried out for 15 minutes while the aforesaid mixed gas being introduced thereinto and the same treatments as Example 1 were repeated to obtain 13.11 g. of a copolymer soluble in heptane. This was teroplymer having propylene content of 32.9 mol percent and an iodine number of 7.3.

EXAMPLE 3

In Example 2, triethyl orthovanadinate was employed as a catalyst in place of vanadium triacetylacetonate, and the terpolymerization was carried out with ethylene-propylene gas containing 32 mole percent of ethylene for 10 minutes to obtain 10.04 g. of a copolymer.

EXAMPLE 4

By employing the same procedures as in Example 1, a mixed gas of ethylene-butene-1 containing 30 mol percent of ethylene was saturated at 60° C. with use of 1 l. of tetrachloroethylene. 5 mmol of 5-(1'-ethyl-ethenyl)-2-norbornene was poured therein. 10 mmol of an organoaluminum halide solution prepared by mixing triisobutylaluminum and aluminum bromide in a ratio of 1:1 was thereto added, and 4 mmol. of vanadium tetrachloride was further added thereto in this order. The polymerization was carried out for 1 hour, and as a result, 3.72 g. of a terpolymer were obtained.

EXAMPLE 5

1 l. of n-heptane was poured into a four-necked flask of 2 l. capacity under a nitrogen atmosphere, and a mixed gas consisting of 35 mol percent of ethylene and 65 mol percent of propylene was saturated therewith at 25° C. 6 mmol. of isopropenyl norbornene, 10 mmol of ethyl-aluminum dichloride, 10 mmol of benzenesulfonyl chloride and 0.01 mmol of vanadyl trichloride were added thereto in this order. The polymerization was carried out for 30 minutes while introducing the aforesaid mixed monomer gas thereinto. After 30 minutes, 15 ml. of methanol containing β-phenylnaphthylamine was added thereto to terminate the polymerization. The polymerized product was taken out therefrom, treated with a 1:1 mixed solution of methanolhydrochloric acid for several times and repeatedly washed with water. Thus, the purified heptane solution was poured in a large amount of methanol to precipitate polymer. In these treatments, no polymer insoluble in heptane was observed. The polymerization resultant vacuum-dried at 40° C. was 10.18 g. with an intrinsic viscosity of 1.55 dl./g. and having 25.2 mole percent of propylene and an iodine number of 14.7. Said polymerization resultant was sulfur-cured according to the same procedure as in Example 1, and as a result, the values of tensile strength 205 kg./cm.$^2$, elongation 300% and 300% modulus 192 kg./cm.$^2$ were attained.

When benzenesulfonyl chloride was not used in the above-mentioned conditions, the polymer obtained according to this example was only 0.02 g.

EXAMPLE 6

In procedures similar to those of Example 5, 4 mmol. of ethylaluminum dichloride, 2 mmol of p-toluenesulfonyl chloride, 0.02 mmol. of triethyl orthovanadinate and 6 mmol of isopropenyl norbornene were dissolved in 1 l. of cyclohexane and the polymerization was carried out at 20° C. for 30 minutes while a mixed gas consisting of 30 mole percent of ethylene and 70 mole percent of propylene being saturated therewith to obtain 12.95 g. of a copolymer.

EXAMPLE 7

In Example 5, the polymerization was carried out with use of 5 mmol of methanesulfonyl chloride in place of the benzenesulfonyl chloride, and 0.05 mmol of vanadyl-acetylacetonate dichloride and 5 mmol of isopropenyl norbornene in place of the vanadyl trichloride, to obtain 8.47 g. of terpolymer.

EXAMPLE 8

By employing the same equipment as in Example 1, ethylene was saturated with 1 l. of n-heptane. 1 mmol of 5-(1'-ethyl-ethenyl) norbornene-2, 2 mmol. of isobutyl-aluminum dichloride, 1 mmol. of p-toluenesulfonyl chloride and 0.003 mmol. of vanadium tetrachloride were added thereto in this order, and the polymerization was carried out for 10 minutes while ceaselessly supplying ethylene therewith. As a result of the above polymerization, 8.91 g. of copolymer insoluble in heptane was obtained.

What is claim is:

1. A solid, linear, sulfur curable, elastomeric copolymer consisting essentially of about 40 to 90 mole percent of ethylene, about 60 to 10 mole percent of an α-olefin having the general formula $CH_2=CHR'$ where R' represents an alkyl group having 1 to 8 carbon atoms, and about 0.5 to 10 mole percent of a norbornene compound having the general formula

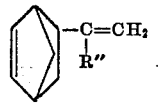

wherein R'' represents a hydrocarbon radical having 1 to 8 carbon atoms.

2. A sulfur-curable, elastomeric terpolymer consisting of 40–90 mole percent of ethylene, 60–10 mole percent of propylene and 0.5–10 mole percent of isopropenyl-norbornene.

3. A solid, linear, sulfur curable elastomeric copolymer consisting of 40 to 90 mole percent of ethylene, 60 to 10 mole percent of an α=olefin selected from the group consisting of propylene and butene-1, and 0.5 to 10 mole percent of isopropenyl norbornene.

4. A process for producing a copolymer characterized by contacting at a temperature of about −78° to +100° C. and at a pressure of up to 30 kg./cm.$^2$ ethylene and/or α-olefin having the general formula $CH_2=CHR'$, wherein R' represents an alkyl group containing 1 to 8 carbon atoms, and a norbornene compound having the general formula

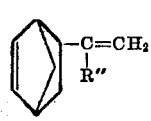

wherein R'' represents a hydrocarbon radical having 1 to 8 carbon atoms, with an organoaluminum halogen compound having the general formula $AlR_nX_{3-n}$, wherein R represents a hydrocarbon radical having 1 to 20 carbon atoms, X is a halogen, and n represents an arbitrary number of 1 to 2, and a vanadium compound in which at least one group selected from the group consisting of halogen, acetylacetonate, alkoxide, cyclopentadienyl and organic acid residue, is bonded to the vanadium.

5. A process according to claim 4, wherein ethylene and propylene, or butene-1 and isopropenylnorbornene are used.

6. A process according to claim 4, wherein the concentration of the organoaluminum halide is 0.1–100 mmol./l., and that of the vanadium compound is 0.001–50 mmol/l.

7. A process for producing a copolymer characterized by contacting at a temperature of about −78° to +100° C. and at a pressure of up to 30 kg./cm.$^2$ ethylene and/or α-olefin having the general formula $CH_2=CHR'$ wherein R' represents an alkyl group having 1 to 8 carbon atoms, and a norbornene compound having the general formula

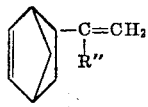

wherein R" represents a hydrocarbon radical having 1 to 8 carbon atoms, with an organoaluminum halogen compound having the general formula $AlRX_2$, wherein R represents a hydrocarbon radical having 1 to 20 carbon atoms, and X represents a halogen, a compound having the general formula $R^{IV}SO_mY$, where $R^{IV}$ represents a hydrocarbon radical having 1 to 20 carbon atoms or the group having inert substituent thereof, Y represents a halogen and $m$ represents 1 or 2, and a vanadium compound in which at least one group selected from the group consisting of halogen, acetylacetonate, alkoxide, cyclopentadienyl and organic acid residue is bonded to the vanadium.

8. A process according to claim 7, wherein the compound having the general formula $AlRX_2$ is ethylaluminum dichloride, the compound having the general formula $R^{IV}SO_mY$ is toluenesulfonyl chloride, benzenesulfonyl chloride, methanesulfonyl chloride or ethanesulfonyl chloride, and the vanadium compound is halogenated vanadium, halogenated vanadyl, vanadium acetylacetonate, vanadyl acetylacetonate, vanadium haloacetylacetonate, vanadyl haloacetylacetonate, orthovanadic acid ester or halovanadyl alkoxide.

9. A process according to claim 7, wherein the α-olefin is propylene or butene-1, and the norbornene compound is isopropenyl norbornene.

10. A process according to claim 7, wherein the concentration of organealuminum halide is 0.1–100 mmol./l., and that of the vanadium compound is $1 \times 10^{-6}$–10 mmol/l.

11. A process according to claim 7, wherein the compound having the general formula $R^{IV}SO_mY$ is employed in a proportion of 0.001–10 moles per 1 mole of the organoaluminum halide.

12. A process according to claim 7, wherein the compound having the general formula $R^{IV}SO_mY$ and the organoaluminum halide are previously mixed with each other, particularly the same are mixed with each other in an equimolar proportion, and the resultant mixture is added to the reaction mixture.

13. A process according to claim 6, wherein the concentration of the organoaluminum halide is 0.5–20 mmol/l., and the concentration of the vanadium compound is 0.01–2 mmol./l.

References Cited
UNITED STATES PATENTS 3,151,173  7/1964  Nyce _____ 260—666

JOSEPH L. SCHOFER, Primary Examiner

ROGER S. BENJAMIN, Assistant Examiner

U.S. Cl. X.R.
260—88.2, 666